United States Patent [19]

Bindl et al.

[11] Patent Number: 5,504,233

[45] Date of Patent: Apr. 2, 1996

[54] PROCESS FOR THE PREPARATION OF ORGANOSILICON COMPOUNDS CONTAINING CARBOXYL GROUPS

[75] Inventors: Johann Bindl; Herman Petersen, both of Burghausen; Konrad Bachhuber, Emmerting; Monika Ott, Burghausen, all of Germany

[73] Assignee: Wacker-Chemie GmbH, Munich, Germany

[21] Appl. No.: 387,531

[22] Filed: Feb. 13, 1995

[30] Foreign Application Priority Data

Mar. 31, 1994 [DE] Germany .................. 44 11 360.9

[51] Int. Cl.⁶ ............................... C07F 7/08
[52] U.S. Cl. ............... 556/439; 556/415; 556/427
[58] Field of Search ........................... 556/439, 415, 556/427

[56] References Cited

U.S. PATENT DOCUMENTS

Re. 34,415  10/1993  Traver ................ 556/439
2,723,987  11/1955  Speier ................ 556/439
3,464,955   9/1969  Bluestein ............ 556/439
3,729,444   4/1973  Bey ................ 556/439 X
4,895,965   1/1990  Langer .............. 556/439
5,385,999   1/1995  D'Anvers et al. ..... 556/439 X

FOREIGN PATENT DOCUMENTS 0186507   7/1986  European Pat. Off. .
0196169  10/1986  European Pat. Off. .
0463522   1/1992  European Pat. Off. .
0569189  11/1993  European Pat. Off. .

*Primary Examiner*—Paul F. Shaver
*Attorney, Agent, or Firm*—Martin Connaughton

[57] ABSTRACT

The present invention relates to a process for the preparation of organosilicon compounds containing carboxyl groups. According to the process of the invention, organosilicon compounds containing carboxyl groups are prepared in the presence of Brönstedt or Lewis acids at relatively low temperatures thus avoiding undesirable side effects of higher temperatures such as gelling due to crosslinking.

7 Claims, No Drawings

PROCESS FOR THE PREPARATION OF ORGANOSILICON COMPOUNDS CONTAINING CARBOXYL GROUPS

FIELD OF INVENTION

The present invention relates to a process for the preparation of organosilicon compounds containing carboxyl groups by splitting off alkenes from the corresponding organosilicon compounds containing ester-functional groups.

BACKGROUND OF INVENTION

Organopolysiloxanes containing carboxyl groups are employed, for example, as textile finishing agents. Good soft handle effects coupled with a low tendency to yellow are achieved with the textiles treated with these compounds. Organopolysiloxanes containing carboxyl groups are also employed for finishing leather and as release agents.

The preparation of organosilicon compounds containing carboxyl groups by reaction of α-olefins which have a carboxyl group provided with a silyl protective group with silanes or siloxanes which have an Si-H group and subsequent hydrolysis of the silyl protective groups is described in EP-A-196 169. However, this process is very involved, since the hydrolysis of the silyl ester requires large amounts of water and long reaction times at high temperatures because of the heterogeneous system. The water employed in excess must then be removed from the heterogeneous system. This is achieved by distillation with the aid of an entraining agent, such as toluene, used to reduce foaming during the distillation.

SUMMARY OF THE INVENTION

The present invention is based on the object of providing a process for the preparation of organosilicon compounds containing carboxyl groups which is easy to carry out and does not have the disadvantages of the known processes.

The present invention relates to a process for the preparation of organosilicon compounds containing carboxyl groups and comprising at least one unit of the formula $$R^1_a Q_b SiO_{\frac{(4-a-b)}{2}} \quad (I)$$

wherein the substituents $R^1$ are hydrogen atoms or identical or different monovalent $C_1$- to $C_{18}$-hydrocarbon radicals which are optionally substituted by fluorine, chlorine or bromine atoms or cyano groups and are optionally interrupted by the groups —O— or —S— or additional polyoxyalkylene groups, $C_1$- to $C_{12}$-alkoxy radicals or hydroxyl radicals, the substituents Q are identical or different monovalent groups of the formula $$-CR^2_2-CHR^2-R^3-COOH \quad (II)$$

wherein the substituents $R^2$ are hydrogen atoms or identical or different monovalent $C_1$- to $C_{10}$-hydrocarbon radicals which are optionally substituted by fluorine, chlorine or bromine atoms, the substituent $R^3$ is a divalent $C_1$- to $C_{18}$-hydrocarbon radical which is optionally substituted by fluorine, chlorine or bromine atoms or cyano groups and optionally interrupted by the groups —O— or —S— or additional polyoxyalkylene groups, a has the values 0, 1, 2 or 3 and has the values 0, 1, 2, 3 or 4, and the sum of a+b is not more than 4, in which process organosilicon compounds comprising at least one unit of the formula $$R^1_a A_b SiO_{\frac{(4-a-b)}{2}} \quad (III)$$

where in the substituents A are identical or different monovalent groups of the formula $$-CR^2_2-CHR^2-R^3-COOCR^4_2-CHR^5_2 \quad (IV)$$

and $R^4$ and $R^5$ have the same meaning as $R^1$, are heated in the presence of a Brönstedt or Lewis acid.

Alkenes of the formula $$CR^4_2 = CR^5_2 \quad (V)$$

can also be split off from organosilicon compounds of formula (III) by heating without acid catalysis. However, this splitting-off then proceeds at a useful rate only at temperatures above 280° C. At these temperatures, however, secondary reactions of the organosilicon compounds comprising at least one unit of formula (I) take place on the carboxyl groups, in which case gelling due to crosslinking may occur.

The present invention is based on the discovery that the splitting-off of alkenes of formula (V) proceeds at a considerably lower temperature in the presence of Brönstedt or Lewis acids, and the organosilicon compounds comprising at least one unit of formula (I) can thus be prepared in a gentle manner without risk of gelling due to crosslinking. Furthermore, purer products are obtained in higher yields.

In the organosilicon compounds, b has the value 1, 2, 3 or 4 in at least one unit of the above formulae (I) and (III).

Examples of $C_1$- to $C_{18}$-hydrocarbon radicals $R^1$ are alkyl radicals, such as the methyl, ethyl, n-propyl, iso-propyl, n-butyl, isobutyl, tert-butyl, n-pentyl, iso-pentyl, neopentyl and tert-pentyl radicals; hexyl radicals, such as the n-hexyl radical; heptyl radicals, such as the n-heptyl radical; octyl radicals, such as the n-octyl radical and isooctyl radicals, such as the 2,2,4-trimethylpentyl radical; nonyl radicals, such as the n-nonyl radical; decyl radicals, such as the n-decyl radical; dodecyl radicals, such as the n-dodecyl radical; cycloalkyl radicals, such as cyclopentyl, cyclohexyl and cycloheptyl radicals and methylcyclohexyl radicals; aryl radicals, such as the phenyl and the naphthyl radicals; alkaryl radicals, such as o-, m- and p-tolyl radicals, xylyl radicals and ethylphenyl radicals; and aralkyl radicals, such as the benzyl radical and the α- and β-phenylethyl radical.

The above hydrocarbon radicals $R^1$ optionally contain an aliphatic double bond. Examples are alkenyl radicals, such as the vinyl, allyl, 5-hexen-1-yl, E-4-hexen-1-yl, Z-4-hexen-1-yl, 2-(3cyclohexenyl)ethyl and cyclododeca-4,8-dienyl radical. Preferred radicals $R^1$ having an aliphatic double bond are the vinyl, allyl and 5-hexen-1-yl radical.

Preferably, not more than 1% of the hydrocarbon radicals $R^1$ contain a double bond.

Examples of $C_1$- to $C_{18}$-hydrocarbon radicals which are substituted by fluorine, chlorine or bromine atoms are the 3,3,3-trifluoro-n-propyl radical, the 2, 2, 2,2',2',2'-hexafluoroisopropyl radical, the heptafluoroisopropyl radical and the o-, m- and p-chlorophenyl radical.

The alkoxy radicals are the alkyl radicals described above bonded via an oxygen atom. The examples of alkyl radicals also apply to the alkoxy radicals $R^1$.

Examples of the radicals $R^1$ interrupted by polyoxyalkylene groups are the radicals of the formula

  (VI)

in which the substituent $R^6$ is a divalent $C_1$- to $C_6$-alkylene radical, the substituents $R^7$ are hydrogen atoms or identical or different monovalent $C_1$- to $C_6$-hydrocarbon radicals, c has the values 0, 1, 2, 3, 4 or 5 and d has integral values from 1 to 100.

Examples of the monovalent radicals $R^2$, $R^4$ and $R^5$ are listed in the above examples for $R^1$.

Examples of the divalent $C_1$- to $C_{18}$-hydrocarbon radicals $R^3$ are saturated straight- or branched-chain or cyclic alkylene radicals, such as the methylene and ethylene radical, as well as propylene, butylene, pentylene, hexylene, 2-methylpropylene, cyclohexylene, octylene, decylene, dodecylene and octadecylene radicals or unsaturated alkylene or arylene radicals, such as the hexenylene radical and phenylene radicals.

Examples of the radicals $R^3$ interrupted by polyoxyalkylene groups are the above examples of the divalent $C_1$- to $C_{18}$-hydrocarbon radicals interrupted by units $-[O(CHR^7)_c]_d-$, in which $R^7$, c and d have the above meanings.

If the sum of a+b is 4, the organosilicon compounds of the formulae (I) and (III) are silanes, and if the sum is less than 4 they are siloxanes.

Preferably, in the above formulae (I) to (VI) in each case independently of one another, the substituents $R^1$ are methyl, phenyl, $C_1$- to $C_3$-alkoxy or hydroxyl radicals, the substituents $R^2$ are hydrogen atoms or methyl radicals, the substituents $R^3$ are divalent $C_2$- to $C_{18}$-hydrocarbon radicals, or divalent $C_1$- to $C_{18}$-hydrocarbon radicals which are interrupted by additional units $-[O(CHR^7)_c]_d-$, wherein $R^7$ is a hydrogen atom, c has the values 1, 2, 3 or 4 and d has integral values from 1 to 100, in particular from 1 to 50, $R^4$ and $R^5$ are hydrogen atoms or monovalent $C_1$- to $C_5$-alkyl radicals, the substituents $R^6$ are divalent $C_2$- to $C_4$-alkylene radicals, the substituents $R^7$ are hydrogen atoms or identical or different monovalent $C_1$- to $C_4$-alkyl radicals, a has the values 1, 2 or 3, b has the values 0, 1 or 2, c has the values 1, 2, 3 or 4 and d has the values 1 to 50.

Alkenes of formula (V) which are split off are preferably those alkenes having a boiling point at 0.1 MPa of not more than 120° C., in particular 50° C., since these alkenes can easily be removed. Optionally, the removal of the alkenes, which preferably takes place simultaneously with the splitting-off of the alkenes, is carried out under reduced pressure. More preferred alkenes are those having one or more alkyl substituents, for example 1-propene, 2-butene, 2-methyl-2-butene, 2,3-dimethyl-2-butene and, in particular, isobutene.

The process for the preparation of organosilicon compounds containing carboxyl groups is particularly suitable for the preparation of oils in which the ratio of units of formula (I) in which a has the value 2 and b has the value 0 to units of formula (I) in which a has the value 1 or 2 and b has the value 1 is 1:1 to 500:1, preferably 5:1 to 200:1. Preferably, in these oils, the ratio of units of formula (I) in which the sum of a+b has a value which is not 2 to units of formula (I) in which the sum of a+b has the value 2 is 1:1 to 1:1000, in particular 1:5 to 1:300.

The organosilicon compounds containing carboxyl groups preferably have an average viscosity of 10 to 100,000 $mm^2/s$, in particular 50 to 10,000 $mm^2/s$, at 25° C.

Examples of Brönstedt or Lewis acids which can be employed in the process are mineral, carboxylic and sulfonic acids and metal compounds, metal salts and metal complex salts which function as Lewis acid.

Preferred compounds are strong acids, such as boric, tetrafluoroboric and nitric acid, nitrous acid, phosphoric acid, phosphorous acid, hypophosphorous acid, sulfuric acid, sulfurous acid, peroxosulfuric, hydrochloric, hydrofluoric, hydroiodic, hydrobromic, perchloric and hexafluorophosphoric acid, aluminum chloride, zinc chloride, benzenesulfonic, p-toluenesulfonic, methanesulfonic and trifluoromethanesulfonic acid and carboxylic acids, such as chloroacetic, trichloroacetic, acetic, acrylic, benzoic, trifluoroacetic, citric, crotonic, formic, fumaric, maleic, malonic, gallic, itaconic, lactic, tartaric, oxalic, phthalic and succinic acid.

Sulfuric, hydrochloric, trifluoroacetic, tetrafluoroboric and methanesulfonic acid are more preferred, and perchloric acid and trifluoromethanesulfonic acid are especially preferred.

Preferably, 1 ppm to 5%, in particular 10 ppm to 1% and more preferably 50 to 1000 ppm, of acid catalyst, based on the weight of organosilicon compounds comprising units of formula (III) are employed in the process.

The process is preferably carried out at temperatures of not more than 200° C., more preferably not more than 150° C. and in particular not more than 130° C.

The process can be carried out in the presence or in the absence of solvents. Examples of suitable solvents are alcohols, such as methanol, ethanol, n-propanol and isopropanol; ethers, such as dioxane, tetrahydrofuran, diethyl ether and diethylene glycol dimethyl ether; chlorinated hydrocarbons, such as methylene chloride, chloroform, carbon tetrachloride, 1,2-dichloroethane and trichloroethylene; hydrocarbons, such as pentane, n-hexane, hexane isomer mixtures, heptane, octane, wash benzine, petroleum ether, benzene, toluene and xylenes; ketones, such as acetone, methyl ethyl ketone and methyl isobutyl ketone; carbon disulfide and nitrobenzene, or mixtures of these solvents.

The term solvent does not mean that all the reaction components have to dissolve in it. The reaction can also be carried out in a suspension or emulsion of one or more of the reactants, it also being possible for the acid itself to serve as the solvent.

After the reaction, the acid can be stripped off from the product, optionally under reduced pressure, or neutralized with weak bases, such as bicarbonates, acetates and formates, which hardly react with the carboxyl groups of the product. In the normal case, the neutralization products are insoluble in the product and can be removed as solids in a simple manner by filtration.

The organosilicon compounds comprising at least one unit of formula (III) can preferably be prepared by reacting compounds of the formula $$R^1{}_aH_bSiO_{\frac{(4-a-b)}{2}} \quad (VIII)$$

with compounds of the formula $$CR^2{}_2\!=\!CR^2\text{-}R^3\text{-}COOCR^4{}_2\text{-}CHR^5{}_2 \quad (IX)$$

wherein $R^1$, $R^2$, $R^3$, $R^4$, $R^5$ a and b have the above meanings in the presence of a hydrosilylation catalyst.

The preparation of the organosilicon compounds comprising at least one unit of formula (III) is preferably carried out without isolation of the product. The reaction mixture can preferably be employed for the preparation of the organosilicon compounds comprising at least one unit of formula (I).

The above preparation of the organosilicon compounds comprising at least one unit of formula (III) is preferably carried out at temperatures from 50° C. to 150° C., in particular at 80° C. to 120° C. Solvents which can be employed are the solvents listed for the preparation of the organosilicon compounds comprising at least one unit of formula (I).

Known hydrosilylation catalysts can be used for the preparation of the organosilicon compounds comprising at least one unit of formula (III). Platinum and compounds thereof are preferably employed.

The compounds of formula (IX) can preferably be prepared by reacting compounds of the formula $$CR^2{}_2\!=\!CR^2\!-\!R^3\!-\!COOH \quad (X)$$

in which $R^2$ and $R^3$ have the above meanings, with alkenes of formula (V).

An acid is preferably employed as a catalyst for the preparation of the compounds of formula (IX). Examples of suitable acids are the acids listed for the preparation of the organosilicon compounds comprising at least one unit of formula (I).

The compounds of formula (IX) can also be prepared, for example, by reacting compounds of formula (X) with the corresponding alcohols.

In the following examples, unless stated otherwise, (a) all the amounts data are based on the weight;

(b) all the pressures are 0.10 MPa (absolute);

(c) all the temperatures are 20° C.

EXAMPLE 1

DSC analysis of the catalysis activity of various acids for the t-butyl ester cleavage An amount of about 40 mg of the organo-modified silicone oil of the following structure:

Me$_3$SiO(Me$_2$SiO)$_x$(MeSiO)$_y$SiMe$_3$
|
(CH$_2$)$_{10}$
|
O=C—O—CMe$_3$ x:y = 50:1 was melted together with a catalytic amount of acid in pressure-resistant glass ampules and the mixture was subjected to DSC measurement. The heat-up rate was 10° C./minute and the range from 20° C. to 400° C. was measured. Splitting off of the t-butyl group as isobutene is detectable in the form of an endothermic peak, and the results are shown in detail in the following table:

| Acid type | Acid concentration (% by weight) | Peak temperature (°C.) |
|---|---|---|
| no acid | — | 295 |
| sulfuric acid | 0.1 | 195 |
|  | 1.0 | 138 |
| perchloric acid | 0.16 | 145 |
|  | 1.1 | 85 |
| trifluoro-methanesulfonic acid | 0.1 | 103 |
|  | 0.01 | 95 |

Trifluoromethanesulfonic acid accordingly shows the highest catalytic activity, and even at a concentration of 100 ppm lowers the temperature for splitting off the alkene from 295° C. to about 100° C.

EXAMPLE 2

Preparation of the comb-like silicone oil containing carboxyl functional groups of Example 1

69 g (0.27 mole) of t-butyl 10-undecenoate were initially introduced into the reaction vessel together with 156 g (0,037 mole of SiH) of a polydimethylsiloxane having comb-like hydrogen groups and the mixture was heated to 80° C. under nitrogen as inert gas. 1.95 ml of a Pt catalyst in toluene (0.5% of Pt, bonded in polymeric form) were added at this temperature and the mixture was heated up to 100° C. A further 624 g (0.150 mole of SiH) of the above polydimethylsiloxane having comb-like hydrogen groups were then metered in over a period of 1 hour. After a further hour at 100° C., a further 0.98 ml of the above mentioned Pt catalyst was added and the mixture was stirred at 100° C. for 1 hour. The resulting product was not isolated, but acid-catalyzed splitting-off of the t-butyl group was carried out directly. For this, 0.05 ml of trifluoromethanesulfonic acid was added at a temperature of 80° C. and the mixture was then stirred at 120° C. for 2 hours. After the catalyst had been neutralized with 0.85 g of sodium bicarbonate at 80° C., the volatile constituents were removed at 120° C. under a vacuum of 5 mbar. The mixture was then cooled and filtered and an almost colorless clear oil having the following characteristic data was obtained:

| | |
|---|---|
| Viscosity (25° C.): | 500 mm²/s |
| Acid content: | 20 mg of KOH/g |
| Structure (according to $^1$H NMR analysis): | |
| | Me$_3$SiO(Me$_2$SiO)$_x$(MeSiO)$_y$SiMe$_3$ |
| |                                | |
| | (CH$_2$)$_{10}$ |
| x:y = 50:1 | O=C—O—H |

EXAMPLE 3

Preparation of a silicone oil containing α, -carboxyl functional groups 126 g (0.53 mole) of t-butyl 10-undecenoate were initially introduced into the reaction vessel together with 300 g (0,075 mole of SiH) of an α, ω-hydrido-polydimethylsiloxane, and the mixture was rendered inert with nitrogen and heated up to 80° C. 3.71 ml of a Pt catalyst in toluene (0.5% of Pt, bonded in polymeric form) were then added and the mixture was heated further to 100° C. A further 1200 g (0.30 mole of SiH) of the above α, ω-hydrido-polydimethylsiloxane were now metered in over a period of 1 hour and, when the metering had ended, the mixture was stirred for a further hour. A further 1.86 ml of the above Pt catalyst were then added and the mixture was stirred at 100° C. for 1 hour. 0.095 ml of trifluoromethanesulfonic acid was then added to split off the t-butyl group at a temperature of 80° C. The mixture was stirred at 120° C. for 2 hours and neutralized with 1.6 g of sodium bicarbonate (1 hour/80° C.), the volatile constituents were removed at 120° C./5 mbar and the mixture was cooled and filtered. An almost colorless clear oil having the following characteristic data was obtained:

| | |
|---|---|
| Viscosity: | 370 mm$^2$/s |
| Acid content: | 19.6 mg of KOH/g |
| Structure (according to $^1$H NMR analysis): | |
| HO$_2$C(CH$_2$)$_{10}$ SiMe$_2$O(Me$_2$SiO)$_{100}$ SiMe$_2$(CH$_2$)$_{10}$CO$_2$H | |

What is claimed is:

1. A process for preparation of an organosilicon compound containing carboxyl groups and consisting of at least one unit of the formula $$R^1_a Q_b SiO_{\frac{(4-a-b)}{2}} \quad (I)$$

wherein the substituents $R^1$ are hydrogen atoms or identical different $C_1$- to $C_{18}$-hydrocarbon radicals, the substituents Q are identical or different monovalent groups of the formula $$-CR^2_2-CHR^2-R^3-COOH \quad (II)$$

wherein the substituents $R^2$ are hydrogen atoms or identical or different monovalent $C_1$- to $C_{10}$-hydrocarbon radicals hydrocarbon radicals, the substituent $R^3$ is a divalent $C_1$- to $C_{18}$-hydrocarbon radical, a has the values 0, 1, 2 or 3 and b has the values 0, 1, 2, 3 or 4, and the sum of a+b is not more than 4, in which process organosilicon compounds comprising at least one unit of the formula $$R^1_a A_b SiO_{\frac{(4-a-b)}{2}} \quad (III)$$

wherein the substituents A are identical or different monovalent groups of the formula $$-CR^2_2-CHR^2-R^3-COOCR^4_2-CHR^5_2 \quad (IV)$$

and $R^4$ and $R^5$ have the same meanings as $R^1$, a and b have the same meaning as above, with the proviso that b has a value of 1, 2, 3 or 4 in at least one unit of formula (III), are heated in the presence of a Bröstedt or Lewis acid.

2. The process as claimed in claim 1, wherein $R^4$ and $R^5$ are hydrogen atoms or monovalent $C_1$- to C5-alkyl radicals.

3. The process as claimed in claim 1, wherein the substituents $R^3$ are divalent $C_2$- to $C_{18}$-hydrocarbon radicals, or divalent $C_1$- to $C_{18}$-hydrocarbon radicals which are interrupted by units —[O(CHR$^7$)$_c$]$_d$—, in which $R^7$ is a hydrogen atom, c has the values 1, 2, 3 or 4 and d has integer values from 1 to 50.

4. The process as claimed in claim 1, wherein the substituents $R^2$ are hydrogen atoms or methyl radicals.

5. The process as claimed in claim 1, wherein the acid is chosen from the group consisting of sulfuric, hydrochloric, trifluoroacetic, tetrafluoroboric, methanesulfonic, perchloric and trifluoromethanesulfonic acid.

6. A process for the preparation of an organosilicon compound containing carboxyl groups, wherein $R^1$, $R^2$, and $R^3$ independent of each other, are substituted with fluorine, chlorine or bromine atoms or cyano groups.

7. A process for the preparation of an organosilicon compound containing carboxyl groups, wherein $R^1$ and $R^3$, independent of the other —O—, —S—, polyoxyalkylene groups, $C_1$ to $C_{12}$-alkoxy radicals or hydroxyl radicals.

* * * * *

UNITED STATES PATENT AND TRADEMARK OFFICE
CERTIFICATE OF CORRECTION

PATENT NO. : 5,504,233
DATED : April 2, 1996
INVENTOR(S) : Johann Bindl, Herman Peterson, Konrad Bachhuber and Minoka Ott It is certified that error appears in the above-indentified patent and that said Letters Patent is hereby corrected as shown below:

Claim 1, col. 7, line 25, at beginning of line, insert "or" before "different"; line 34, delete "hydrocarbon radicals".

Claim 3, col. 8, line 21, delete "-[O(CR$^7$)$_c$]$_d$-" and insert in lieu of --- -[O(CR$^7$)$_c$]$_d$- ---.

Claim 1, col. 7, line 25 after "different" insert --monovalent--.

Signed and Sealed this

Thirteenth Day of August, 1996

Attest:

BRUCE LEHMAN

Attesting Officer     Commissioner of Patents and Trademarks